United States Patent [19]
Goebel

[11] Patent Number: 5,479,821
[45] Date of Patent: Jan. 2, 1996

[54] METHOD AND APPARATUS FOR MEASURING UNBALANCE OF A MOTOR VEHICLE WHEEL ON A MOTOR VEHICLE

[75] Inventor: Eickhart Goebel, Pfungstadt, Germany

[73] Assignee: Hofmann Werkstatt-Technik GmbH, Pfungstadt, Germany

[21] Appl. No.: 111,820

[22] Filed: Aug. 25, 1993

[30] Foreign Application Priority Data

Aug. 25, 1992 [DE] Germany ............ 42 28 145.8

[51] Int. Cl.⁶ ............................ G01M 1/28
[52] U.S. Cl. .................. 73/457; 73/460; 74/16
[58] Field of Search .............. 73/457, 460, 462, 73/467; 74/16

[56] References Cited

U.S. PATENT DOCUMENTS

| | | | |
|---|---|---|---|
| 2,526,484 | 10/1950 | Jacobsen et al. | 73/457 |
| 3,066,526 | 12/1962 | Tear. | |
| 3,078,720 | 2/1963 | Hofmann, Jr. | 73/457 |
| 3,686,955 | 8/1972 | Butler | 73/457 |
| 3,815,425 | 6/1974 | Skidmore | 73/457 |
| 4,109,532 | 8/1978 | Donato | 73/457 |
| 4,555,943 | 12/1985 | Ohta et al. | 73/457 |
| 4,956,998 | 9/1990 | Goebel | 73/457 |

FOREIGN PATENT DOCUMENTS 0027848 5/1981 European Pat. Off..
0473833 11/1992 European Pat. Off..

OTHER PUBLICATIONS

Goebel, Eickhart, Raderwuchten am Fahrzeug, Journal "Autobaus Sep. 1982", pp. 912–920.

Primary Examiner—Thomas P. Noland
Assistant Examiner—Helen C. Kwok
Attorney, Agent, or Firm—Cushman Darby & Cushman

[57] ABSTRACT

A method and apparatus for measuring unbalance of a vehicle wheel that is freely rotatable and mounted on a motor vehicle. The wheel is rotated during the measuring operation at a measurement speed and a mark on the wheel is sensed to provide accurate information concerning the angular wheel position of the rotating wheel. An incremental generator is operatively associated with the wheel for supplying a predetermined number of increments between each two sensings of the mark on the wheel, which is associated with a rotational angle of 360°. The respective counter condition is used for detecting the rotational angle of the wheel.

28 Claims, 3 Drawing Sheets

METHOD AND APPARATUS FOR MEASURING UNBALANCE OF A MOTOR VEHICLE WHEEL ON A MOTOR VEHICLE

BACKGROUND OF THE INVENTION

One form of method of measuring unbalance of a vehicle wheel when freely and rotatably mounted on a motor vehicle involves rotating the wheel at a measurement speed of rotation that will permit the unbalance measurement operation to proceed. A mark on the wheel is sensed for detecting the speed of rotation and/or the rotational angle of the wheel, and any force resulting from unbalance of the wheel is ascertained, relative to its rotational angle, during the unbalance measuring operation, by centrifugal force measurement. Such a method, and an apparatus for carrying it into effect, is disclosed in the journal 'Autohaus' 9/1982, pages 912–920. The wheel being measured, in order to be freely rotatable, is suitably lifted by means of a jacking device which can be formed at the same time as a force measuring stand.

When dealing with the driving wheels of a motor vehicle, the wheel to be measured may be driven by means of the vehicle engine; while, when dealing with the non-driving wheels of a motor vehicle, the wheel can be driven by means of a friction wheel forming part of a movable piece of equipment and which can be brought into frictional engagement with the motor vehicle wheel to drive it at the speed required for the measuring operation. To carry out the measuring operation itself, the friction wheel is moved away from the motor vehicle wheel again and the unbalance measuring operation is performed as the wheel rotates freely and is in the course of running down.

To provide a selective measurement method, the wheel to be measured may be provided with a reflective reference mark and wheel rotation can then be detected by means of an opto-electronic system such as an infra-red system, for example as is to be found in DE 38 28 724 A1, corresponding to U.S. Pat. No. 4,956,998.

In that procedure, as the wheel rotates, the reference mark passes two adjacently focussed infra-red light beams, a receiver receiving pairs of light reflections from the reference mark. The sequence of double reflections and the measured periods of time between successive double reflections provides information about the direction of wheel rotation, about the mean wheel speed/angular speed during the last period of time of a revolution of a wheel, and changes in the mean speed between the last revolutions. On the basis of that information, and taking into account the variation in speed of rotation in the preceding revolutions of the wheel, the probable period of time can then be extrapolated for the next respective measurement period during a wheel revolution and that anticipated period of time can be so subdivided that the portions thereof correspond to assumed constant rotational angles of the wheel during the same period.

Measurement of centrifugal forces or variations in centrifugal force produced by the wheel which is supported on the jacking device, for example as indicated by a measuring stand during the divided portions of the period of time, and evaluation of the measurement result using procedures which are known in relation to static balancing machines, make it possible to provide for selective measurement of the unbalance vector involved.

When the detected direction of wheel rotation is taken into consideration, the correction or balancing position at which a correction or balancing weight is to be fixed can be indicated, independently of the direction of rotation required to arrive at the appropriate position.

However, inaccuracies can occur by virtue of the fact that the drop in the speed of rotation of the wheel when it is in the phase of rotating freely, and thus gradually slowing down in the actual measuring operation, is not linear. The decrease of rotational speed depends upon a number of factors such as friction, a rubbing brake, the effect of air such as air turbulence, and the like. When the wheel having its unbalance measured is a driving wheel and when the wheel is driven by the vehicle engine to bring it up to the speed of rotation required for the measuring operation, variations in the speed of rotation of the wheel can occur due to the engine not running in a totally smooth fashion or due, for example, to the influence of the differential unit or universal joints in a drive shaft. When such variations in speed of rotation are extrapolated to the period of time involved in the next following revolution of the wheel, they can result in defective evaluation of the measurement signals in terms of ascertaining the appropriate sizes of balancing weights and the correct angular positions for fitting those balancing weights.

It is also difficult for an operator to achieve good alignment of an optical sensing system with a reference mark on a wheel to be measured, and that can also give rise to further errors in the measurement values obtained.

SUMMARY OF THE INVENTION

An object of the present invention is to provide a method of measuring unbalance of a motor vehicle wheel, which affords measurement results of improved accuracy.

Another object of the present invention is to provide a motor vehicle wheel unbalance measurement method which involves a simple operating procedure while nonetheless giving reliable measurement results of enhanced accuracy.

A further object of the present invention is to provide a method of measuring unbalance of a vehicle wheel freely rotatably mounted on a motor vehicle, which gives improved accuracy in evaluation of signals supplied by measuring sensors, for determining the size of at least one balancing weight and the appropriate angular position therefor.

A further object of the present invention is to provide an apparatus for measuring unbalance of a vehicle wheel on a motor vehicle, which while being of structural simplicity can give accurate and reliable measurement results.

In accordance with the principles of the present invention the foregoing and other objects are attained by the method and apparatus in accordance with the invention as set forth herein.

The invention therefore provides that, within the period of time between each two occasions on which a reference mark on the wheel whose unbalance is being measured is sensed, information can be obtained about the instantaneous position and/or the speed of rotation of the wheel. From the respective moment at which the marking on the wheel is sensed, for example by virtue of a reflected beam being received, the increments which occur during the rotary movement of the wheel are counted. The fact that the counter condition which is attained between the detection of each two reference marks, or the reception of each two reference reflections, is associated with a rotational angle of 360° affords accurate information about the respective instantaneous angular position of the rotating wheel. The incremental generator used can be operatively associated with the wheel either by involving contact therewith or by adopting a contact-less mode of operation.

That procedure means that the counter condition is directly proportional to the respective rotational angle of the wheel so that centrifugal force measurement, in which forces resulting from unbalance of the wheel are detected and measured, can be carried out to be precisely related to the rotational angle of the wheel. It is further possible for the measurement values obtained, in dependence on the time which has actually elapsed for the measurement period, to be evaluated or assessed in dependence on the speed of rotation, thereby eliminating the quadratic dependency of centrifugal force on the speed of wheel rotation. Furthermore, the counted increments produced by the incremental generator, which is operatively coupled to the rotating wheel during the measuring operation, provide information about the current or related position of the wheel, relative to the sensed reference mark, the current angular speed or mean speed of rotation, even for a small angular range, and the wheel diameter.

A preferred feature of the invention is that it is the tire of the motor vehicle wheel that is sensed, to produce the necessary increments. In particular, the tread surface of the pneumatic tire can be sensed. To provide that sensing operation, a freely selectable number of pulses or increments can be fixed for each rotation of the respective motor vehicle wheel to be sensed and also for each revolution of a sensing roller where the system has a sensing roller co-operating with a portion of the wheel for sensing the rotary movement thereof.

Preferably, additional sensing of the motor vehicle wheel is such that between each two sensings of the wheel mark, an equal number of increments is supplied by the incremental generator and counted for determining the rotational angle.

As indicated above, the additional sensing effect can be achieved by using a sensing system having a sensing roller which can be applied to the tread surface of the tire of the motor vehicle wheel. The sensing roller can be disposed in a measuring stand which also supports the wheel of the vehicle in a raised condition. This way the sensing roller can be arranged in a position beneath the lifted wheel whose unbalance is being measured. In such a system, for example, the measuring stand may have a front frame bar member which carries the sensing roller and which, when the measuring stand is in the position of supporting the vehicle wheel off the ground, is disposed beneath the vehicle wheel.

Preferably, the sensing roller is mounted resiliently in the measuring stand. The sensing roller can be resiliently applied against the vehicle wheel from a concealed rest position within or beneath the frame bar member of the measuring stand, by manual or automatic actuation, for example when the measuring stand is put under load.

In a preferred feature the incremental generator is of such a configuration that the direction of rotation of the wheel can be detected, on the basis of the increments produced. Detecting the direction of rotation in that way permits an indication, independent of the direction of rotation, of the position required for the appropriate balancing weight to be fixed to the vehicle wheel. That approach also permits the wheel to be rotated in a deliberate and controlled fashion into the exact balancing position after a measuring run. In that respect, the position of the reference mark on the wheel, relative to the measuring equipment, is irrelevant because the same reference point is used both in the unbalance measuring operation and also when turning the wheel into the correct balancing position.

Preferably, for the purposes of contact-less sensing for the production of increments, it is possible to sense surface structures of the motor vehicle wheel and more especially the tire thereof. Sensing can be effected optically or capacitively. For the formation of the increments which are passed to the counter, the surface structure of the wheel can be determined and stored, in the sensing region, for an entire revolution, that is to say over the full angle of the wheel. Preferably the 360° association can then be determined from the repetition of the stored overall structure pattern or from repetition of prominent or clearly defined structures.

A further feature of the invention, including the method according to the invention and the apparatus for carrying out the method in accordance with the invention, can be used for determining the circumference and/or the diameter of a vehicle wheel. This is accomplished by virtue of using the increments formed and the operation of counting those increments being utilized for measuring the circumference or diameter. That is possible because the outside circumference of the sensing roller or the periphery on the wheel at which sensing is effected in a contact-less mode is known. It is also possible therefrom to ascertain the peripheral speed of the wheel so that on the basis of such peripheral speed measurement it is then possible to check and/or calibrate the tachometer of the motor vehicle.

Further objects, features and advantages of the present invention will be apparent from the following description of preferred embodiments.

DESCRIPTION OF PREFERRED EMBODIMENTS

Figure 1:
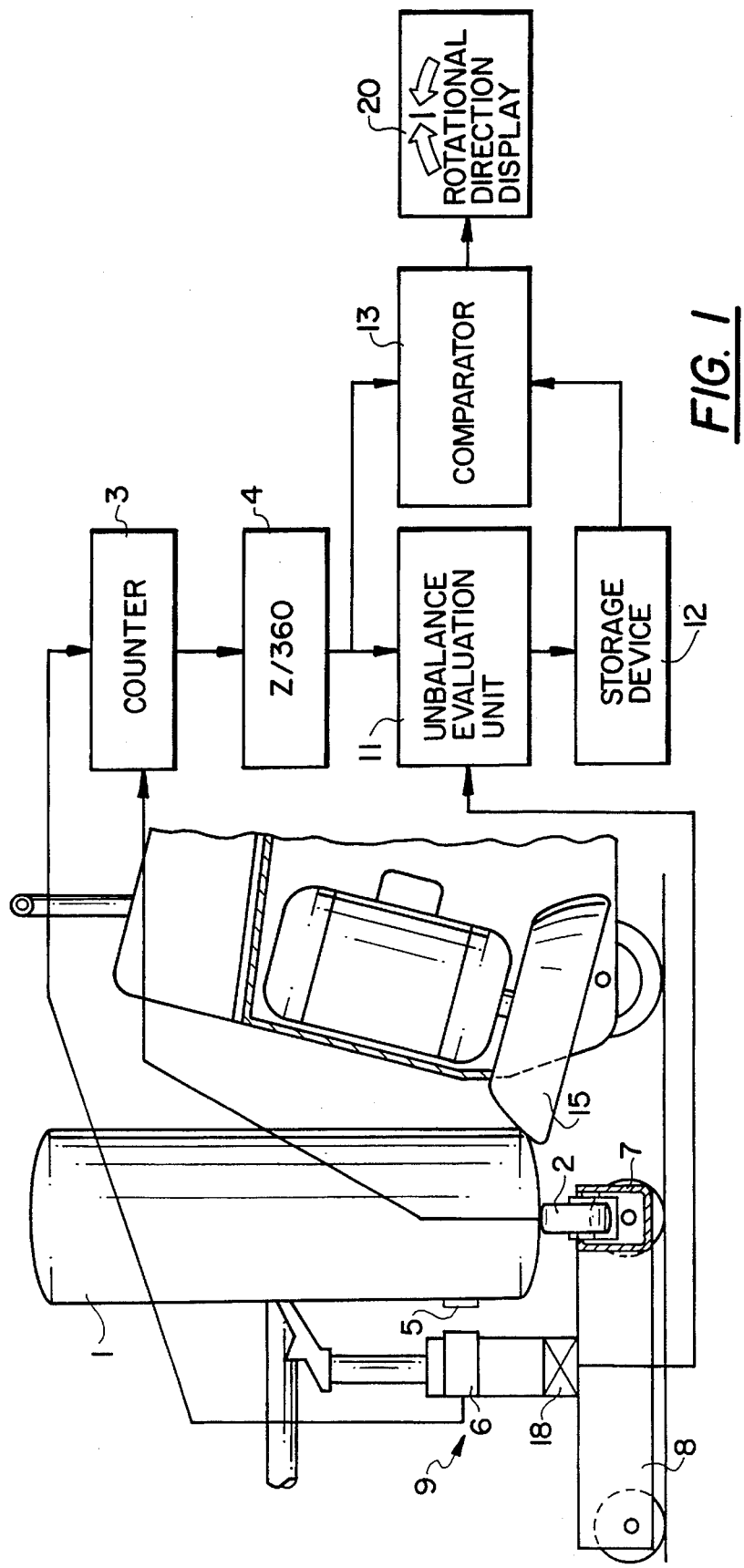
FIG. 1 is a diagrammatic view of a movable unbalance measuring apparatus constituting a first embodiment of the invention.

Referring first to FIG. 1, the apparatus for measuring unbalance of a vehicle wheel of a motor vehicle is comprised of a lifting means (generally indicated at 9) for lifting a wheel 1 whose unbalance is to be measured. The wheel 1 may typically comprise a metal hub having a pneumatic tire mounted thereon and may be, for example, a non-driving wheel of the motor vehicle. The vehicle wheel 1 can be brought up to a given speed of rotation for an unbalance measuring operation by means of a friction wheel 15 which is part of the unbalance measuring apparatus movable on rollers 16. A drive motor 17, such as an electric motor, can be used for driving the friction wheel 15 in rotation. A movable unbalance measuring apparatus of the structure outlined above is described for example in DE 38 28 724 A1, corresponding to U.S. Pat. No. 4,956,998, and also in the above-mentioned vehicle in 'Autohaus' 9/1982 pages 912–920.

The lifting device or wheel jacking device 9 can be in the form of a measuring stand, as is known, for example, from German laid-open application (DE-OS) No 20 58 872. For detecting centrifugal forces which are generated in the unbalance measuring operation by unbalance of the wheel 1 as it rotates, the measuring stand includes a force measuring device 18 whose output signals are passed to an unbalance evaluation unit as indicated at 11, as disclosed in 'Hofmann News' 5, Imprint 09.85D.

Also provided on the lifting device 9 is a sensing device 6 which provides for optical sensing of a reflective reference mark 5 disposed on the vehicle wheel 1 and more especially on the pneumatic tire thereof, with the optical sensing result being subjected to optoelectronic evaluation. Each time the reference mark 5 moves past the sensing device 6, a corresponding pulse is generated and passed to a counter 3.

Also connected to the counter 3 is an incremental generator which is composed of a sensing roller 2 and a sensor device 7 associated with the sensing roller 2. Further details of the incremental generator are shown in FIG. 2 which will be described in greater detail below.

In the FIG. 1 illustrated embodiment, the sensing roller 2 of the incremental generator provides for sensing of the tread surface of the pneumatic tire of the vehicle wheel 1. For that purpose the sensing roller 2 is provided with the sensor device 7 on the lifting means 9. In the illustrated embodiment the incremental generator is arranged on a front transverse frame bar member, similar to the frame bar member indicated at 8 in FIGS. 1 and 3, of the lifting means 9, so that the incremental generator, or more specifically the sensing roller 2 can be moved into a position beneath the wheel 1 to be measured, when lifted by the lifting means 9. During a measuring run the sensing roller is pressed against the tread surface of the tire by means of a spring device, such as compression spring 19 in FIG. 2. The sensing roller 2 can project constantly out of an opening in the transverse frame bar member of the lifting means 9, beneath the wheel 1, but it is alternatively also possible for the sensing roller 2 to be pressed resiliently against the tire of the vehicle wheel 1 only for the balancing operation, by virtue of the sensing roller 2 being moved out of a retracted rest position manually or automatically, for example when a loading is applied to the lifting means or measuring stand 9.

Figure 2:
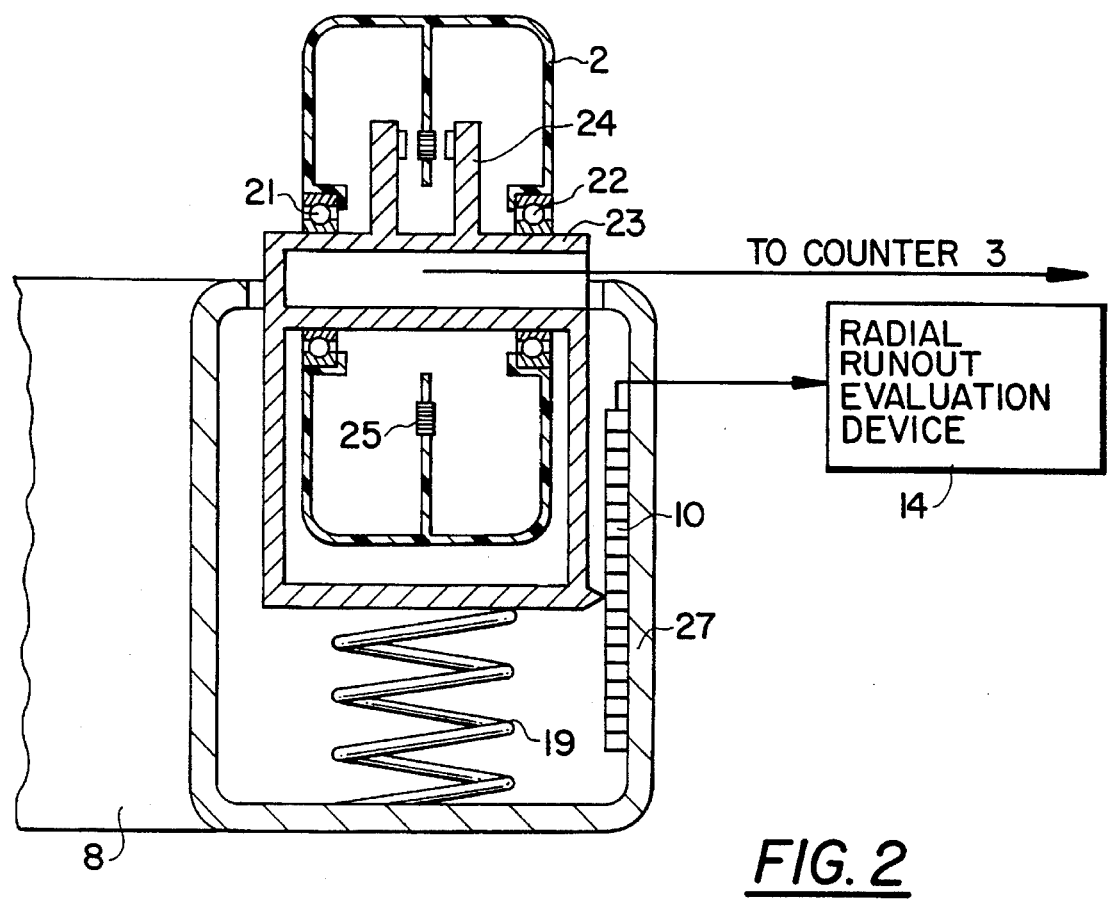
FIG. 2 shows an embodiment of an incremental generator which can be used in the arrangement shown in FIG. 1.

Looking now at FIG. 2, as illustrated, the sensing roller 2 is preferably made from light thin-gauge material and is, for example, in the form of a hollow body made of plastic material. It is mounted as illustrated by means of ball bearing assemblies 21 and 22 on a fixed hollow shaft 23. For the purposes of detecting the rotary movement of the roller body of the sensing roller 2, a sensing device 24 which involves inductive sensing, capacitive sensing or optical sensing, is disposed on the hollow shaft 23. The sensing device cooperates with suitable markings or like elements 25 on the body of the sensing roller 2, more specifically on an annular web portion projecting inwardly in the interior thereof. The sensing device 24 is electrically connected to the sensing device 7 which transmits corresponding increment signals to counter 3. The counter 3 is caused to count by virtue of the increments, beginning with a respective signal, for example a pulse, which is produced by a mark 5 on the vehicle wheel 1, as it passes the sensing device 6.

The counter 3 supplies a reference device, indicated at 4 in FIG. 1, which can be, for example, in the form of a divider, with the counter rate between two reference signals produced by the marking 5 on the vehicle wheel 1. Because that counter rate is divided in the angle reference device 4, as indicated by the legend Z/360 in FIG. 1, that provides angle-proportional information for each increment which reaches the counter 3. If the number of increments between each two reference pulses produced by the mark 5 is Z, being the respective counter rate of the counter 3, each increment contains an angle value of Z/360. Those continuous items of information, regarding angular values, are transmitted during the measuring run to the unbalance evaluation unit 11. Then, in the latter, the magnitude of the correcting or balancing weight to be fitted to the vehicle wheel 1 for balancing thereof and the angular position in which at least one balancing weight is to be fixed to the vehicle wheel are calculated in the usual fashion which does not need to be described in detail herein as it is a known and conventional procedure. Both the size of the balancing weight and the angular position required for same can be displayed and then after the measuring operation the operator can turn the wheel to the appropriate position for fixing the balancing weight thereto.

It is, however, also possible only to display the size of the balancing weight required and to store the angular position required for the balancing weight to be fixed to the vehicle wheel 1 in a storage device 12 which is connected to the unbalance evaluation unit 11. For the purposes of turning the vehicle wheel 1 into the balancing position, the incremental generator comprising the sensing roller 2 and the sensor device 7 supplies by way of the counter 3 and the angle reference device 4 corresponding items of information in respect of rotational angle which are passed to a comparator 13 connected to the storage device 12. Any deviation in respect of the respective rotational angular position of the vehicle wheel 1 which needs to be rotated into the position for balancing thereof, and the attainment of the balancing position, can be displayed in the usual fashion by a display device 20, for example a light emitting diode device. The display device can be actuated by the comparator 13 and indicate the direction in which the vehicle wheel 1 needs to be rotated to move it into the correct position for balancing thereof, so that the operator can then know when the vehicle wheel 1 is in the correct balancing position. Then, for example, the balancing weight can be fitted when the wheel 1 is in the 12 o'clock position.

The sensing roller 2 can also function to indicate a geometrical deviation on the part of the vehicle wheel 1 from the desired true running condition thereof, that is to say radial runout of the wheel. Such radial runout can be detected in a preferably vertical direction by virtue of vertical displaceability of the hollow shaft 23 and therewith the sensing roller 2 mounted thereon in the frame bar member 8 of the lifting device 9. For that purpose the assembly which includes the sensing roller 2 may also have a vertical guide, as indicated at 27 in FIG. 2, which also accommodates the compression spring 19. Vertical movement of the hollow shaft 23 caused by radial runout of the vehicle wheel 1 can then be detected by means of a sensor device, as indicated at 10 in FIG. 2. A corresponding output signal can then be sent to a radial runout evaluation unit 14.

Figure 3:
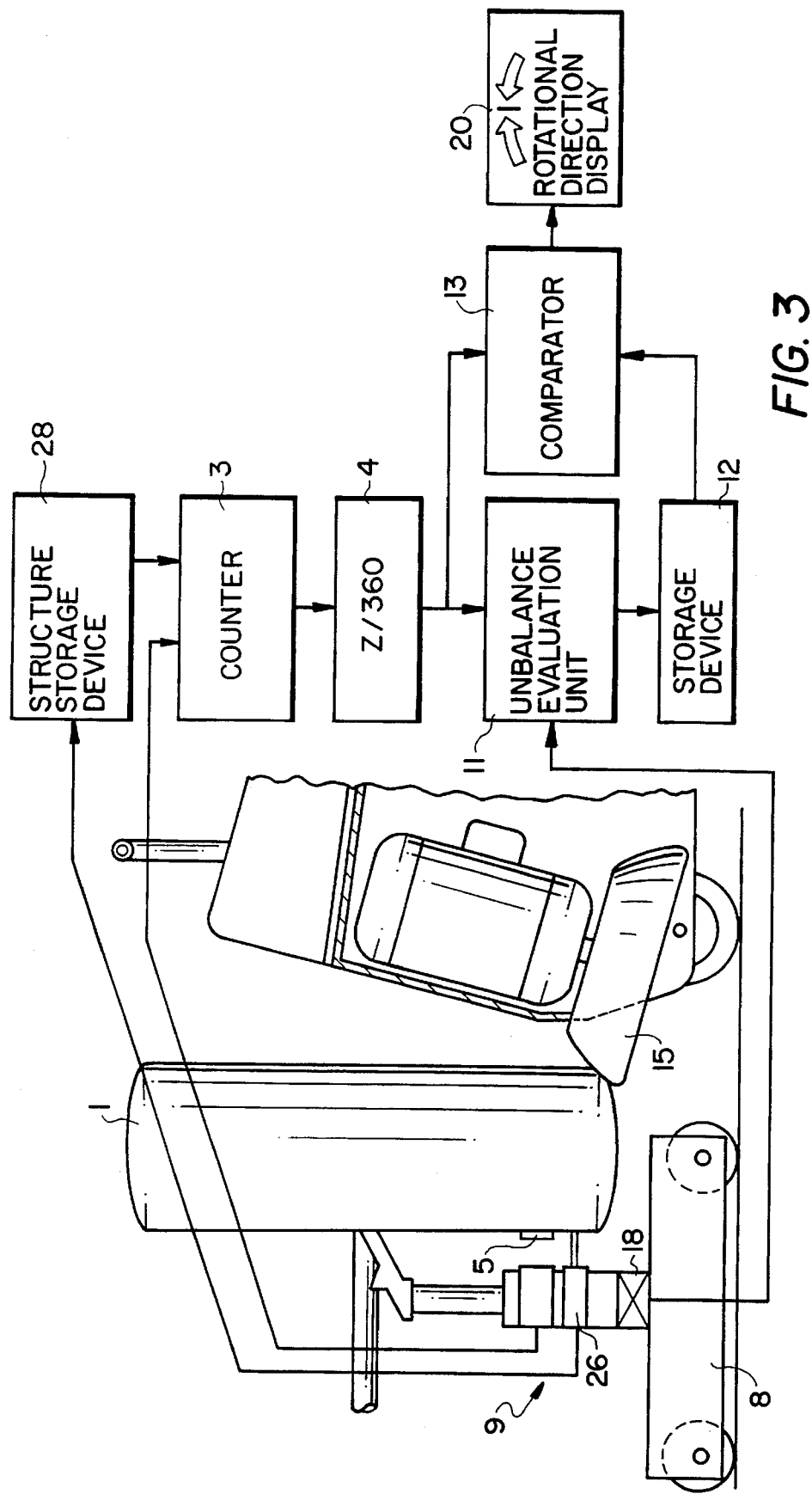
FIG. 3 shows a further embodiment of an unbalance measuring apparatus according to the invention.

Reference will now be made to FIG. 3 which shows an unbalance measuring apparatus designed for contact-less sensing of the vehicle wheel 1 with pneumatic tire. For that purpose, the arrangement includes a sensing device 26 which, for example, can operate optically or capacitively. A surface structure configuration or a prominent or clearly defined structure of the tire can be put into storage by means of the sensing device 26. In that respect, storage may be effected, in the sensed region, over a complete revolution or full angle of 360° in which case the entire structural pattern contained in that angle on the vehicle wheel tire is sensed and stored in a structure storage device, as indicated diagrammatically at 28 in FIG. 3, which is suitably connected to the sensing device 26. Structural configurations or clearly defined structural patterns on the tire can be called up from the storage device 28 and passed in the form of intents to the counter 3. Subsequent operation and evaluation of the counter results then takes place in the same manner as described above with reference to the embodiment of FIG. 1 to which attention is, therefore, accordingly directed again at this time.

It will be noted from the foregoing that the invention affords the advantage that there is no longer any need for the sensing device for sensing a reference mark on the vehicle wheel to be oriented centrally with respect to the wheel, insofar as the sensing device can be arranged on the lifting means for lifting the wheel. It is, however, also possible for the sensing device to be provided on the movable unbalance measuring unit which includes the friction wheel indicated at in FIGS. 1 and 3. Furthermore, a vehicle wheel to which at least one balancing weight is to be fixed at least one balancing position can be turned into the appropriate balancing position precisely and without reliance on the capability on the part of the operator for assessing the appropriate position by eye. Exact division of a revolution of a vehicle wheel into equal angular segments for obtaining measurement values is effected independently of variations in the speed of rotation during that revolution, thereby providing a higher degree of measuring accuracy. While at the present time a known movable unbalance measuring unit can achieve a degree of angular resolution of about 15° the arrangement according to the invention makes it possible to achieve a level of angular resolution which is equivalent to that of static or stationary unbalance measuring machines. There is no need to indicate an unbalance angle as a suitable display for that purpose is provided by the rotational direction display as indicated at 20 in FIGS. 1 and 3, as for example in the case of stationary machines, see, for example, the Hofmann prospectus 'Geodyna 30/45/85, Imprint 940212208-87D'. The vehicle wheel can be suitably turned into the balancing position in any direction so that the direction which involves the shortest movement for turning the vehicle wheel into the balancing position, from any wheel position after a measuring run, can be suitably indicated for use by the operator.

As indicated above, a sensing roller which bears resiliently against the tread surface of the tire of a vehicle wheel can also be employed when the wheel is rotating to sense the outside contour of the wheel so that it is consequently possible to detect, in relation to angular positioning of the wheel, any geometrical defect in the wheel, generally referred to as radial runout. That makes it possible to display the radial runout in the form of a vector or an angle-related graphic display. In addition, for providing power, one or more batteries may, for example, be used as usual as the power supply for the movable unbalance measuring unit. Alternatively, other power supplies could be used, such as a wire to a power source. The one or more batteries can be charged up not only by using the mains system, as is usual, but furthermore the additional sensing roller as indicated at 2 in FIG. 1 can serve to drive a generator as the sensing roller is rotated by the rotary movement of the vehicle wheel 1, thereby to charge up the battery or batteries.

It will be appreciated that the above-described methods and apparatuses according to the present invention have been set forth solely by way of example and illustration of the principles thereof and that various modifications and alterations may be made therein without thereby departing from the spirit and scope of the invention.

What is claimed is:

1. An apparatus for measuring unbalance of a vehicle wheel freely rotatably mounted on a motor vehicle, comprising:

a lifting means for raising the vehicle wheel to be measured;

a drive means for driving the vehicle wheel in rotation;

a sensing means for sensing at least one of a speed of rotation of the vehicle wheel and a rotational angle of the vehicle wheel, said sensing means including means for sensing a marking on the vehicle wheel;

a force measuring means for ascertaining centrifugal forces resulting from unbalance of the vehicle wheel;

an evaluation means for determining at least one correcting weight size and at least one angular position at which at least one weight having said at least one correcting weight size is to be fixed to the vehicle wheel;

an incremental generator in rolling engagement with said Vehicle wheel and rotated by said vehicle wheel for generating increment signals corresponding to rotation of the vehicle wheel; and a rotational angle generator connected to the means for sensing a marking on the vehicle wheel and to the incremental generator, for determining the rotational angle of the vehicle wheel based on a counting rate between each two successive sensings of the markings on the vehicle wheel by said means for sensing a marking on the vehicle wheel compared with a full rotation of the vehicle wheel.

2. Apparatus as set forth in claim 1 wherein the incremental generator includes a sensing roller adapted to bear against a tire of the wheel.

3. Apparatus as set forth in claim 2 wherein the sensing roller is adapted to be applied to a tread surface of the tire of the wheel.

4. Apparatus as set forth in claim 2 wherein the lifting means has at least one frame bar member and wherein said sensing roller is rotatably mounted in said frame bar member.

5. Apparatus as set forth in claim 2 including means for mounting said sensing roller movably in an at least substantially vertical direction.

6. Apparatus as set forth in claim 2 including means for resiliently mounted said sensing roller.

7. Apparatus as set forth in claim 2 including a sensing means for detecting a movement of the sensing roller in an at least substantially vertical direction.

8. A method of measuring unbalance of a vehicle wheel mounted on a motor vehicle and being freely rotatable, during an unbalance measuring operation, said method comprising the steps of:

generating increment signals representative of a rotational angle of the vehicle wheel using in incremental generator having a sensor device in rolling engagement with the vehicle wheel, rotating the vehicle wheel at a measurement speed of rotation, counting pulses created by sensing a mark on the vehicle wheel, counting the increment signals from the sensor device, determining a number of increment signals between two pulses equivalent to a rotational angle of 360° and determining an equivalent rotational angle of the vehicle wheel which corresponds to one of said increment signals, measuring an unbalance force resulting from unbalance of the vehicle wheel and relating a maximum measured unbalance force to a distinctive number of counted increment signals, determining an angular position of a balancing weight at the vehicle wheel based on the distinctive number of counted increment signals, and turning the Vehicle wheel to an appropriate position for fixing a balancing weight based on the distinctive number of counted increment signals.

9. A method as in claim 8 wherein
said counting pulses step counts at least three pulses, and
an equal number of increment signals is supplied by the incremental generator between adjacent pulses in said counting pulses step.

10. A method as in claim 8, wherein said generating step senses a tread surface of the wheel.

11. A method as in claim 8 wherein said rotating the vehicle wheel is achieved by a vehicle engine.

12. A method as in claim 8 wherein said rotating the vehicle wheel is achieved by a friction wheel drive.

13. A method of measuring unbalance of a vehicle wheel mounted on a motor vehicle and being freely rotatable, during an unbalance measuring operation, said method comprising the steps of:
using an increments generator to generate increments representative of a rotational angle of the vehicle wheel by sensing surface structure patterns on the vehicle wheel using a contactless sensor device,
rotating the vehicle wheel at a measurement speed of rotation,
counting pulses created by sensing a mark on the vehicle wheel,
counting said increments from the sensor device,
determining a number of increments between two pulses equivalent to a rotational angle of 360° and determining an equivalent rotational angle of the vehicle wheel Which corresponds to one of said increments,
measuring an unbalance force resulting from unbalance of the vehicle wheel and relating a maximum measured unbalance force to a distinctive number of counted increments,
determining an angular position of a balancing weight at the vehicle wheel based on the distinctive number of counted increments, and
turning the vehicle wheel to an appropriate position for fixing a balancing weight based on the distinctive number of counted increments.

14. A method as in claim 13 wherein
said counting pulses step counts at least three pulses, and
an equal number of increments is supplied by the incremental generator between adjacent pulses in said counting pulses step.

15. A method as in claim 13, said generating step senses a tread surface of the wheel.

16. A method as in claim 13 wherein said rotating the vehicle wheel is achieved by a vehicle engine.

17. A method as in claim 13 wherein said rotating the vehicle wheel is achieved by a friction wheel drive.

18. A method as in claim 13, said generating step comprising a step of using an optical sensor to generate said increments.

19. A method as in claim 13, said generating step comprising a step of using a capacitive sensor to generate said increments.

20. A method as in claim 13, further comprising the step of:
storing a surface structure pattern of the vehicle wheel in a region of said vehicle wheel sensed over a full revolution,
wherein said determining an equivalent rotational angle step determines said rotation angle based on a repetition of an entire protrusion pattern of said vehicle wheel resulting from a rotation of said vehicle wheel through an angle of more than 360°.

21. A method as in claim 13, further comprising the step of:
storing a protrusion pattern of the vehicle wheel in a region of said vehicle wheel sensed over a full revolution,
wherein said determining an equivalent rotational angle step determines said rotation angle based on a repetition of predetermined indicia.

22. An apparatus for measuring unbalance of a vehicle wheel freely rotatably mounted on a motor vehicle, comprising:
a lifting means for raising the vehicle wheel to be measured;
a drive means for driving the vehicle wheel in rotation;
a sensing means for sensing at least one of a speed of rotation of the vehicle wheel and a rotational angle of the vehicle wheel, said sensing means including means for sensing a marking on the vehicle wheel;
a force measuring means for ascertaining centrifugal forces resulting from unbalance of the vehicle wheel;
an evaluation means for determining at least one correcting weight size and at least one angular position at which at least one weight having said at least one correcting weight size is to be fixed to the vehicle wheel;
contact-less sensing means for sensing a surface structure pattern of said vehicle wheel and for producing the increments based on said surface structure to indicate rotation of the vehicle wheel;
a rotational angle generator connected to the means for sensing a marking on the vehicle wheel and to the contact-less sensing means, for determining a rotational angle of the vehicle wheel based on a counting rate between each two successive sensings of the markings on the vehicle wheel by said means for sensing a marking on the vehicle wheel compared with a full rotation of the vehicle wheel.

23. Apparatus as set forth in claim 22 comprising an optical sensor.

24. Apparatus as set forth in claim 22 comprising a capacitive sensor.

25. Apparatus as set forth in claim 22 wherein the contact-less sensing means is combined with a means for sensing a wheel marking.

26. Apparatus as set forth in claim 22 wherein the contact-less sensing means is combined with a means for sensing a marking on the tire of said wheel.

27. Apparatus as set forth in claim 22 including
means for storing the surface structure pattern in a region of said vehicle wheel sensed over a full revolution,
said rotational angle generator determines said rotation angle based on a repetition of an entire surface structure pattern of said vehicle wheel resulting from a rotation of said vehicle wheel through an angle of more than 360°.

28. Apparatus as set forth in claim 22 including
means for storing the surface structure pattern in a region of said vehicle wheel sensed over a full revolution,
said rotational angle generator determines said rotation angle based on a repetition of predetermined indicia.

\* \* \* \* \*